May 25, 1926.
W. F. LANGE
TUB FASTENER
Filed Oct. 30, 1925
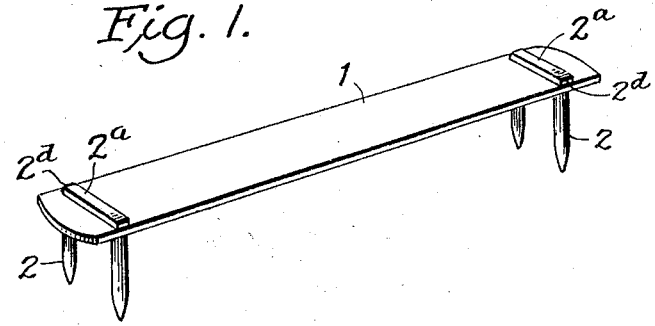
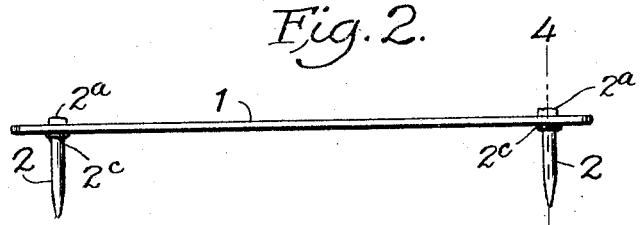
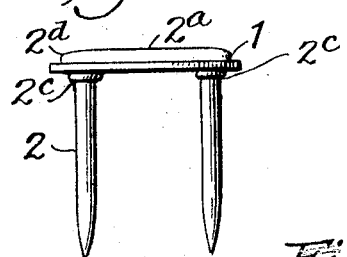
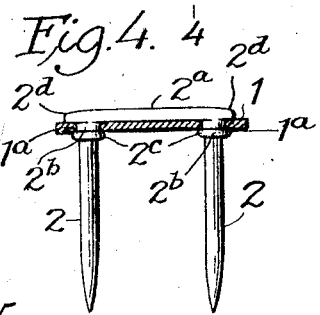
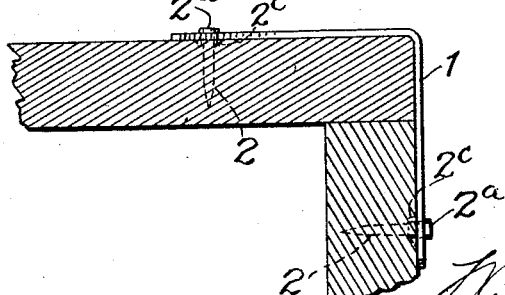
Inventor
William F. Lange
By Alexander Dowell
Attorneys Patented May 25, 1926.

1,586,370

UNITED STATES PATENT OFFICE.

WILLIAM F. LANGE, OF ELGIN, ILLINOIS, ASSIGNOR TO ELGIN BUTTER TUB CO., OF ELGIN, ILLINOIS, A CORPORATION OF ILLINOIS.

TUB FASTENER.

Application filed October 30, 1925. Serial No. 65,896.

This invention is an improvement in so-called "tub fasteners" commonly used to fasten wooden covers to wooden tubs, buckets, and other wooden packages.

The object of the invention is to provide a fastener which can be more quickly and certainly applied than the common fasteners, and will be more securely fastened when applied; and which might be appropriately termed a 4-nail-strap-riveted fastener.

The invention includes not only the fastener, but also the novel staples forming part of such fastener as hereinafter explained.

I will explain the invention with reference to the accompanying drawings which illustrate a practical embodiment thereof, and summarize in the claims the novel fastener and features thereof for which protection is desired.

In said drawings:—

Figure 1 is a perspective view of a fastener;

Figure 2 is a side view thereof;

Figure 3 is an enlarged end view thereof;

Figure 4 is an enlarged section on the line 4—4, in Figure 1.

Figure 5 is a detail view illustrating one mode of using the fastener.

The fastener comprises a flexible strap body 1, preferably formed of tin or other suitable sheet metal. This body is provided near each end with a pair of adjacent perforations $1^a$ for the passage of the legs of staple members as shown in the drawings.

The staple members are preferably stamped or formed from wire; and each comprises a pair of similar opposite parallel legs 2, and an integral top portion $2^a$ connecting the upper ends of the legs 2. The legs 2 are provided with cylindric enlargements $2^b$ adjacent the top member $2^a$, which enlargements are adapted to tightly fit in the perforations $1^a$ in the body 1 and may be upset, swaged or riveted on the under side of the body strap 1, as indicated at $2^c$, to firmly fasten the staple member to the strap. The top member $2^a$ preferably is also provided with projecting end portions $2^d$ which extend beyond the enlargements $2^b$ of the legs and are adapted to engage the top of the body strap and hold the same down at the outer sides of the openings $1^b$.

As shown in Figures 1 and 2, the complete fastener comprises a body strap having two legs or nails 2 at or near each end, formed by the novel staple-members as described. The body being flexible each pair of legs can be driven as a unit; and the legs pass through the tin, and not merely beside it; and the twin nail or staple at each end of the body will not bend when driven in, as ordinary staples do.

The said fastener forms a novel and useful article of manufacture.

These fasteners have been practically used, and have met with great favor in the trade; because they are strong, more easily driven, and more secure when applied than the ordinary fasteners heretofore used.

I claim:

1. A box fastener comprising a flexible strap metal body provided with a pair of adjacent perforations near each end, and a staple member adjacent each end of the strap member having its legs engaged with the adjacent perforations in the body and its top portion projecting beyond the legs, and engaging the top of the strap, each leg of each staple having an enlargement at its end engaged with the strap, substantially as described.

2. A box fastener comprising a flexible strap metal body provided with a pair of adjacent perforations near each end, and a staple member adjacent each end of the strap member having its legs engaged with the adjacent perforations in the body and its top portion engaging the top of the strap; means on the legs for engagement with the perforations, the top member of each staple projecting beyond the outer sides of the legs to engage the top of the strap member.

3. A box fastener comprising a flexible strap metal body provided with a pair of adjacent perforations near each end, and a staple member adjacent each end of the strap member having its legs engaged with the adjacent perforations in the body and its top portion engaging the top of the strap; each leg of each staple having an enlargement at its end for engagement with the perforation in the strap, and the top member of each staple having shoulders projecting beyond the outer sides of the legs to engage the top of the strap member.

In testimony that I claim the foregoing as my own, I affix my signature.

WILLIAM F. LANGE.